United States Patent [19]
Klotz

[11] 4,319,151
[45] Mar. 9, 1982

[54] PULSE GENERATOR

[75] Inventor: Hermann Klotz, Heidelberg, Fed. Rep. of Germany

[73] Assignee: Teldix G.m.b.H., Heidelberg, Fed. Rep. of Germany

[21] Appl. No.: 131,547

[22] Filed: Mar. 18, 1980

[51] Int. Cl.³ .......................................... H02K 21/00
[52] U.S. Cl. ................................ 310/152; 310/155; 310/156
[58] Field of Search ................ 310/152, 158, 154, 156

[56] References Cited

U.S. PATENT DOCUMENTS 3,969,644 7/1976 Nowak ................................. 310/152
4,150,314 4/1979 Zabler ................................. 310/156

OTHER PUBLICATIONS

"Wiegand Wire: New Material for Magnetic-Based Devices", *Electronics*, 7/10/75, pp. 100-105.

*Primary Examiner*—Donovan F. Duggan
*Attorney, Agent, or Firm*—Spencer & Kaye

[57] ABSTRACT

A pulse generator composed of a stator, a part which is movable with respect to the stator, a coil of wire, at least one Wiegand wire, and at least one magnet which causes the Wiegand wire to generate pulses in the coil based on the Wiegand effect, upon movement of the movable part. The magnetic field produced by the magnet is of such an asymmetrical form with respect to the Wiegand wire that the pulses show a positive or negative polarity depending on the sense of movement of the movable part.

17 Claims, 7 Drawing Figures

PULSE GENERATOR

BACKGROUND OF THE INVENTION

The invention relates to a pulse generator comprising a part, preferably a rotor which is movable with respect to a stator and means for generating a magnetic field which affects at least one Wiegand wire to generate in a coil pulses based on the Wiegand effect upon movement of the moving part.

Such a pulse generator is known from the German Offenlegungsschrift 26 54 755 in which the rotor is provided with a number of permanent magnets of alternating polarity and the stator is provided with a coil and a Wiegand wire. The latter is exposed to a magnetic field uniformly changing in size and direction when the rotor rotates. Because of the Wiegand effect, needle pulses are generated in the coil in an instantaneous manner when a given field strength is reached at the reversal of the magnetic field. These needle pulses are largely independent of speed and show an alternating positive and negative polarity.

In an article in the magazine "Electronics" of July 10, 1975 (pages 100 to 105), the Wiegand wire and the Wiegand effect are described in detail. The Wiegand wire consists of well known magnetizable materials, such as Permalloy and Vicalloy, which are alloys derived from nickel, iron, cobalt or vanadium. Such polycrystalline materials possess domains which can be oriented by applying a magnetic field so that after removing the magnetic field these materials themselves generate a magnetic field. If the material is then exposed to an opposite magnetic field, a demagnetization or reversed magnetization is caused when the coercive field strength is exceeded. Thus, the curve of magnetization shows the characteristic hysteresis. By special treatment of the wire, that is, by a twisting action, the core of the wire obtains a comparatively low coercive force while the shell is provided with a higher coercive force. The Wiegand effect is characterized by the fact that the demagnetization of the core is related to a very rapid reversal of the domains when the low coercive force is exceeded. Thus, a very short high-amplitude needle pulse can be generated in a coil. With a short Wiegand wire measuring about 1 cm in length and roughly 0.1 mm in diameter, a core coercive force of 10 Oe and a shell coercive force of 20 to 30 Oe have been measured.

In the described pulse generator, the Wiegand wire is exposed to a comparatively high magnetic field of alternating polarity because of the rotation of the rotor. Thus, positive and negative needle pulses are generated whereby the number per unit of time is a measure of speed. However, in addition to speed there are numerous applications in which the sense of direction is also of interest. This applies particularly to navigation systems in which both vehicle speed and sense of rotation of the wheels are measured by using a pulse generator connected to the wheels of the vehicle. Furthermore, positioning devices for machine tools require information on the direction of movement. Previously, it has been customary to determine the sense of rotation from the phasing of at least two pulses or pulse trains. Yet, this required a higher technical input for the pulse generators and for the circuitry to allow the determination of the phase sequence.

SUMMARY OF THE INVENTION

The object of the invention is to provide a pulse generator using simple means and applying the Wiegand effect. The signals from the pulse generator are to be also a direct measure for the sense of rotation.

This problem is solved by a pulse generator in which one or several magnets are arranged so that the magnetic field with respect to the Wiegand wire is of such an asymmetrical form that the said pulses show a positive or negative polarity depending on the sense of the movement of the moving part.

The invention is characterized by its particularly straightforward and cost-effective design. By the above described magnetic field and the mounting of the Wiegand wire, positive or negative pulses are generated as a function of the sense or rotation. Thus, a special evaluation of the pulses is not necessary. The invention is based on the knowledge that by a suitable arrangement of the Wiegand wire and by a suitable generation of the magnetic field, which changes because of the relative movement between magnet and Wiegand wire as to its size and direction, each time only a rapid reversal of the domains of the Wiegand wire in one direction is effected. The direction of this fast reversal depends on the preceding direction of polarization of the Wiegand wire which, in turn, depends on the respective direction of movement of the moving part. The polarity of the needle pulses generated in the coil is therefore a measure for the sense of rotation of the rotor. The form of the magnetic field can be generated by several means, particularly by suitable pole shoes or by an assymetric arrangement of permanent magnets. One type of arrangement that is preferred is the mounting of two bar-shaped permanent magnets of opposite polarity close to each other. To obtain a resulting magnetic field with an assymmetric behavior, the permanent magnets are displaced to each other along their longitudinal axes. The same effect can also be achieved by using suitable pole shoes. In that case, the Wiegand wire is substantially parallel to the permanent magnets. If the moving part is a rotor, it is expedient to mount both the Wiegand wire and the permanent magnets parallel to the rotor's axis of rotation. A particularly favorable approach is the arrangement of one or several Wiegand wires on the rotor. Since the Wiegand wires are comparably light, there are no particular problems with balancing the rotor. Since with such an arrangement, the permanent magnets are mounted on the stator, induced voltages are avoided that might occur with arrangements on the rotor.

DESCRIPTION OF THE PREFERRED EMBODIMENTS

Figure 1:
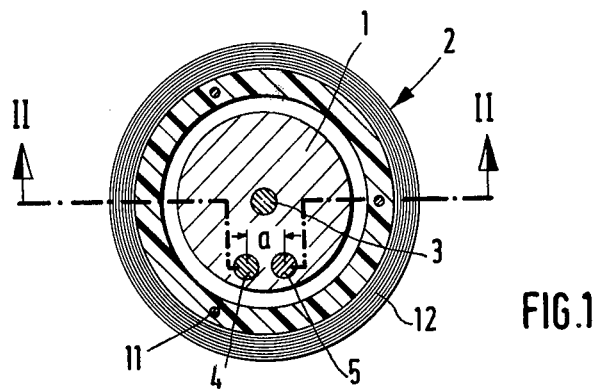
FIG. 1 shows a cross section of a pulse generator for the determination of the sense of rotation and speed of a shaft with axially displaced permanent magnets provided on the rotor.
Figure 2:
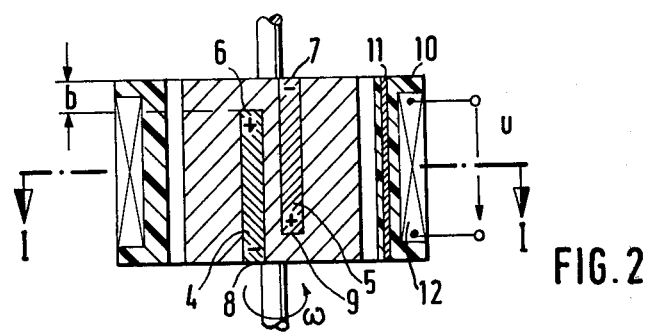
FIG. 2 shows a longitudinal section of the pulse generator according to FIG. 1 along the intersection line II.
Figure 3:
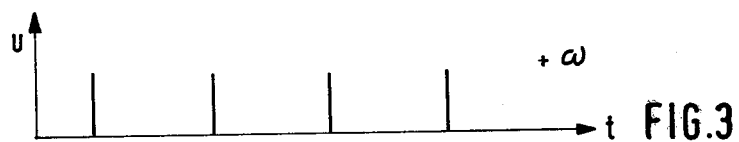
FIGS. 3 and 4 show the voltage pulses generated by the pulse generator, for both senses of rotation.
Figure 4:
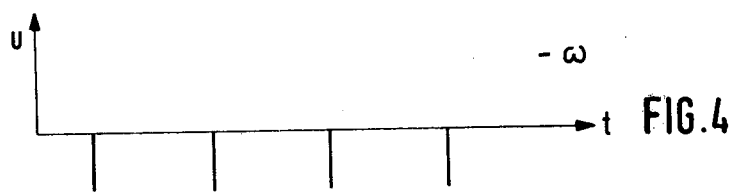

The pulse generator shown in the schematic of FIG. 1 incorporates a rotor 1 which is mounted inside a stator 2 and arranged around a shaft 3 so as to allow its rotation. The rotor 1 consists of a magnetically nonconducting material and contains close to its outside surface two bar-shaped permanent magnets 4 and 5 of opposite polarization which are separated by a small preselectable distance a in the circumferential direction. FIG. 2 shows that the permanent magnets 4, 5 are mounted in axial boreholes of the rotor 1 in parallel to shaft 3 and/or the axis of rotation of the rotor. The displacement arrangement of the permanent magnets 4, 5 in axial direction is of decisive importance. The upper ends 6, 7 of the permanent magnets 4, 5 in FIG. 2 are separated by a distance b which also applies to the lower ends 8, 9. This asymmetric arrangement of the permanent magnets results in an asymmetric form of the magnetic field. Stator 2 incorporates a bobbin 10 with a U-shaped cross section in which a ring coil 12 is embedded. The bobbin 10 is provided with longitudinal boreholes for the Wiegand wires 11 which extend over the total axial length of the bobbin and are within the ring coil 12. Instead of the three Wiegand wires shown, more Wiegand wires can be used, if necessary, in order to obtain a higher resolution. In rotating the shaft 3 at a rotational speed ω in one sense of rotation, the Wiegand wires 11 are permeated sequentially by the magnetic field of the permanent magnets 4, 5. If the field strength acting on a Wiegand wire exceeds a defined value, which is preselected according to the magnetization characteristic and the respective conditions of size, the direction of polarization changes abruptly. Because of the asymmetric shape of the magnetic field, it is achieved by the invention that the needle pulses induced in the ring coil 12 always show the same positive polarity for the one sense of rotation according to FIG. 3. Of course, during the rotor rotation there is also a resetting of the polarization direction which, however, does not lead to a needle pulse because of the shape of the magnetic field. Yet, if the rotor 1 rotates in the opposite direction, the changing of the polarization direction of the Wiegand wires 11 to the opposite direction results in needle pulses which among themselves show the same negative polarity as depicted in FIG. 4.

Since three Wiegand wires 11 are displaced on the circumference, there are three needle pulses per rotor revolution for both senses of rotation and the number of needle pulses per time unit corresponds to the speed of shaft 3.

Figure 5:
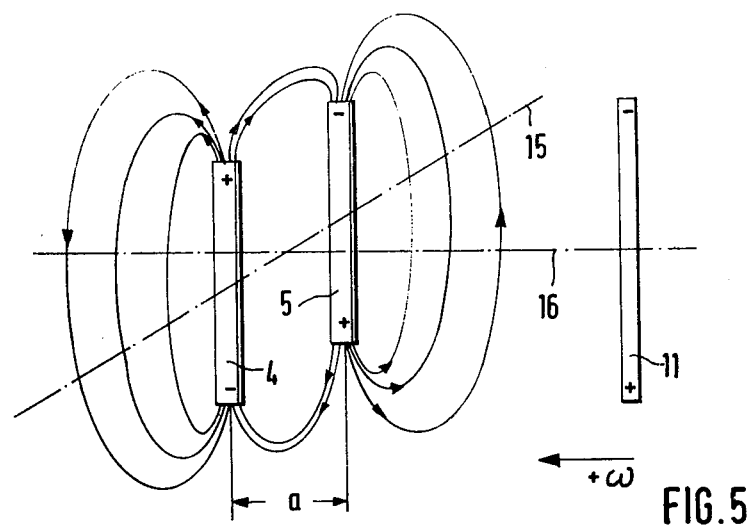
FIG. 5 shows the magnetic field of the permanent magnets of the pulse generator of FIG. 1.

The magnetic field resulting from the two permanent magnets 4, 5 is shown in an approximate way in FIG. 5. Since the permanent magnets are displaced by a distance a in the circumferential direction and are displaced by a distance b in the direction of the axis or rotation there is an asymmetric field whose imaginary center plane 15 is displaced from the radial plane 16 by a corresponding angle. In turning the rotor, there is a relative movement between permanent magnets 4, 5 and the Wiegand wire 11 which is to be presented in the following description by a movement of the Wiegand wire 11.

In reality, this movement takes place on a circular path whereby the radial distance between the Wiegand wire and the permanent magnets is to be taken into account. Furthermore, it should be noted that the Wiegand wire is exposed to the magnetic field which expands in the three-dimensional space. For purpose of the description, assume first that the Wiegand wire in the way shown here is polarized and the lower end is provided with a positive magnetic pole and the upper end with a negative magnetic pole. The core and shell of the Wiegand wire 11 are polarized in the same manner. In moving the Wiegand wire in the direction of the arrow +ω, the Wiegand wire passes into the opposed magnetic field and in exceeding the coercive force there is an abrupt demagnetization of the Wiegand wire. Consequently, a positive needle pulse, for instance, is generated in the encompassing coil. By further moving the Wiegand wire, the latter is again polarized for demagnetized and shows the polarization shown in FIG. 5 when it leaves the magnetic field. Now, it is of significance that only one needle pulse is induced while the remaining magnetization processes do not result in a needle pulse. This may be explained by the fact that the further magnetization of demagnetization of the Wiegand wire in the various sections of the relatively long Wiegand wire take place in a sequence or are compensated as to their effect so that no pulses or only negligible ones are induced in the coil. After leaving the magnetic field, the Wiegand wire exhibits the same polarization as it did when entering the field. In moving the Wiegand wire shown in FIG. 5 from the left to the right, that is, opposite to the direction of the arrow +ω, it shows a polarization when it leaves the magnetic field which is opposite to the one shown in the drawing. In continuing this movement, the Wiegand wire again enters the magnetic field, and the abrupt demagnetization causes now a negative needle pulse.

Figure 6:
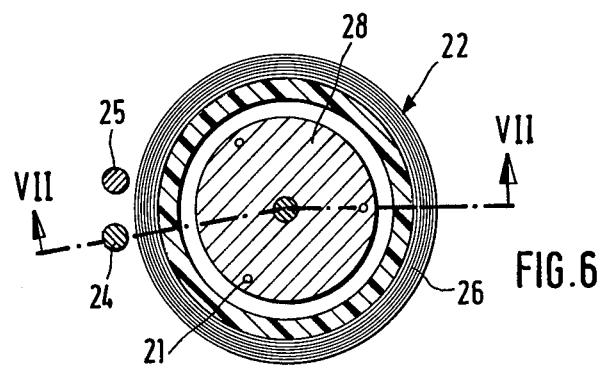
FIG. 6 shows a cross section of a pulse generator which is provided with axially displaced permanent magnets on the stator.
Figure 7:
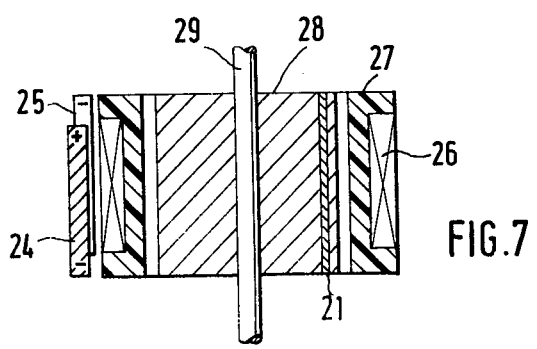
FIG. 7 shows a longitudinal section of a pulse generator according to FIG. 6 along the intersection line VII.

FIGS. 6 and 7 show another design approach to the pulse generator. Here, the bar-shaped permanent magnets 24, 25 are mounted on the stator 22 outside the ring coil 26. In the circumferential direction, the permanent magnets 24, 25 are separated by a preselectable distance and are displaced with respect to each other in the axial direction. The ring coil 26 is mounted on a bobbin 27 which is made of an electrically and magnetically nonconducting material, e.g. plastic. Inside the bobbin 27, the cylindrical rotor 28 is fixed to a shaft 29 which allows for rotational movement. The rotor 28 is provided with three axial boreholes in the axial direction. These boreholes are equally displaced in the circumferential direction and receive the Wiegand wires 21. The principle of operation corresponds to that of the pulse generator described above.

The invention is by no means limited to the examples given above. On the contrary, the required field behavior can also be achieved by appropriately designed pole shoes of a magnet which can also be realized in the form of an electromagnet. It is of importance that by a suitable realization of the arrangement of magnets and the corresponding location of at least one Wiegand wire element, positive or negative voltage pulses can be generated as a function of the sense of direction. It can be derived from the above examples that a pulse generator can also be provided for the surveillance of translatory movements between a rotor and a stator.

What is claimed is:

1. A pulse generator comprising: a stator; a rotor of magnetically nonconducting material rotatable with respect to said stator; an annular bobbin made of a magnetically nonconducting material; a coil of wire mounted on said bobbin to be concentric with said rotor; at least one Wiegand wire mounted on said stator;

and at least two permanent magnets carried by said rotor, and oriented parallel to, and polarized in respectively opposite directions relative to, the axis of rotation of said rotor, said two magnets being spaced apart in the circumferential direction of said rotor by a small first distance and being offset from one another by a second distance in the direction of the axis of rotation of said rotor; said magnets, said coil and said Wiegand wire being positioned relative to one another in a manner to cause said Wiegand wire to generate pulses in said coil based on the Wiegand effect upon rotation of said rotor, and the magnetic field produced by said magnets being of such an asymmetrical form with respect to said Wiegand wire that said pulses all have only a positive or negative polarity depending on the sense of rotation of the said rotor.

2. A pulse generator according to claim 1, wherein said magnets are arranged close to the outside surface of said rotor.

3. A pulse generator according to claim 1, wherein there are three of said Wiegand wires, mounted on said stator.

4. A pulse generator according to claim 3 wherein said bobbin is fixed to said stator and said Wiegand wires are arranged in axially extending boreholes in said bobbin.

5. A pulse generator according to claim 1, wherein said at least one Wiegand wire is essentially of the same length as said bobbin.

6. A pulse generator according to claim 1, wherein said permanent magnets are shorter than said rotor by said second distance.

7. A pulse generator comprising: a stator of magnetically nonconducting material; a rotor of magnetically nonconducting material rotatable with respect to said stator; an annular bobbin made of a magnetically nonconducting material fixed to said stator; a coil of wire mounted on said bobbin to be concentric with said rotor; at least one Wiegand wire mounted on said rotor; and at least two permanent magnets fixed relative to said stator; and oriented parallel to, and polarized in respectively opposite directions relative to, the axis of rotation of said rotor, said two magnets being spaced apart in the circumferential direction of said stator by a small first distance and being offset from one another by a second distance in the direction of the axis of rotation of said rotor; said magnets, said coil and said Wiegand wire being positioned relative to one another in a manner to cause said Wiegand wire to generate pulses in said coil based on the Wiegand wire to generate pulses in said coil based on the Wiegand effect upon rotation of said rotor, and the magnetic field produced by said magnets being of such an asymmetrical form with respect to said Wiegand wire that said pulses all have only a positive or negative polarity depending on the sense of rotation of said rotor.

8. A pulse generator according to claim 7 wherein said at least one Wiegand wire is essentially of the same length as said rotor.

9. A pulse generator according to claim 7, wherein said at least one Wiegand wire is mounted close to the outside surface of said rotor.

10. A pulse generator according to claim 9, wherein said at least one Wiegand wire is arranged in an axially extending borehole in said rotor.

11. A pulse generator according to claim 7 wherein said permanent magnets are shorter than said bobbin by said second distance.

12. A pulse generator according to claim 1 or 7 wherein said Wiegand wire and said magnetic field are arranged such that said Wiegand wire can pass in and out of said magnetic field, wherein upon rotation of said rotor, said Wiegand wire is polarized in a direction depending on the sense of rotation by leaving the magnetic field, and wherein as said Wiegand wire enters the magnetic field again, a needle pulse is generated in the coil because of the Wiegand effect, the polarity of this needle pulse depending on said direction of polarization and thereby on the sense of rotation.

13. A pulse generator according to claim 12 wherein said Wiegand wire is of a length such that for one sense of rotation, each time the strength of the magnetic field acting on said Wiegand wire exceeds a predetermined value, a needle pulse of one polarity is generated and that for the opposite sense of rotation in a corresponding manner a needle pulse of opposite polarity is generated.

14. A pulse generator according to claim 12, wherein said magnetic field is such that for one sense of rotation, each time the strength of the magnetic field acting on said Wiegand wire exceeds a predetermined value, a needle pulse of one polarity is generated and that for the opposite sense of rotation in a corresponding manner a needle pulse of opposite polarity is generated.

15. A pulse generator according to claim 1 or 7 wherein said coil is designed as a ring coil, which encompasses said rotor, whereby a cylindrical air gap is formed between said rotor and ring coil.

16. A pulse generator according to claim 1 or 7, wherein said permanent magnets are bar shaped.

17. A pulse generator according to claim 1 or 7, wherein said magnetically nonconducting material of said bobbin is a plastic material.

* * * * *